United States Patent
Siefert (10) Patent No.: US 6,662,240 B1
(45) Date of Patent: Dec. 9, 2003

(54) AUTOMATED CONFIGURATION OF COMPUTER ACCESSORIES

(75) Inventor: David M. Siefert, Englewood, OH (US)

(73) Assignee: NCR Corporation, Dayton, OH (US)

( * ) Notice: Subject to any disclaimer, the term of this patent is extended or adjusted under 35 U.S.C. 154(b) by 1010 days.

(21) Appl. No.: 08/646,567

(22) Filed: May 8, 1996

(51) Int. Cl.[7] .......................... G06F 13/10; G06F 13/20
(52) U.S. Cl. ........................... 710/8; 710/10; 710/62; 370/406; 360/69; 713/100
(58) Field of Search ................. 395/750, 653, 395/550, 882, 828, 830; 360/69; 370/406; 710/8, 10, 62; 713/100; 364/560

(56) References Cited

U.S. PATENT DOCUMENTS

| | | | | |
|---|---|---|---|---|
| 4,701,878 A | | 10/1987 | Gunkel et al. ............. 364/900 |
| 5,088,091 A | * | 2/1992 | Schroeder ................. 370/406 |
| 5,115,511 A | * | 5/1992 | Nilsson .................... 395/800 |
| 5,173,865 A | * | 12/1992 | Koike ...................... 364/560 |
| 5,224,094 A | * | 6/1993 | Maher ...................... 370/62 |
| 5,373,288 A | * | 12/1994 | Blahut .................. 340/825.08 |
| 5,394,541 A | * | 2/1995 | Chesley et al. ............ 395/550 |
| 5,408,619 A | * | 4/1995 | Oran ....................... 395/325 |
| 5,491,804 A | * | 2/1996 | Heath et al. ................ 710/7 |
| 5,539,590 A | * | 7/1996 | Tateishi .................... 360/69 |
| 5,561,813 A | | 10/1996 | Hwang ..................... 395/829 |
| 5,619,724 A | * | 4/1997 | Moore ........................ 710/9 |
| 5,634,074 A | * | 5/1997 | Devon et al. ............... 395/828 |
| 5,636,342 A | * | 6/1997 | Jeffries ................. 395/185.01 |
| 5,675,811 A | * | 10/1997 | Broedner et al. .......... 395/750 |
| 5,682,529 A | * | 10/1997 | Hendry .................... 395/653 |
| 5,684,469 A | * | 11/1997 | Toms et al. ............ 340/825.07 |
| 5,689,684 A | * | 11/1997 | Mulchandani et al. ...... 395/500 |
| 5,768,542 A | * | 6/1998 | Enstrom et al. ............ 395/284 |
| 5,768,622 A | * | 6/1998 | Lory et al. ................. 395/855 |
| 5,774,662 A | * | 6/1998 | Sakagawa ............... 395/200.33 |

OTHER PUBLICATIONS

"Hardware Adapter Configuration", IBM TDB vol. 31, No. 12, p. 344, May 1989.*

* cited by examiner

Primary Examiner—Jeffrey Gaffin
Assistant Examiner—Rehana Perveen
(74) Attorney, Agent, or Firm—Gregory A. Welte; Paul W. Martin (57) ABSTRACT

A system for automated configuration of computer peripherals. Peripherals are equipped with identification codes, which can be read by a computer, and which identify the type of peripheral. The computer stores a look-up table of configuration modes required for each peripheral type. When the computer polls a peripheral, and learns, from the identification code, that a peripheral type has changed, the computer orders a re-configuration of necessary equipment, to accommodate the change.

6 Claims, 9 Drawing Sheets

PRIOR ART

AUTOMATED CONFIGURATION OF COMPUTER ACCESSORIES

The invention includes an identification code within computer equipment. Using the code, the computer configures itself to be compatible with the equipment.

BACKGROUND OF THE INVENTION

Figure 1:
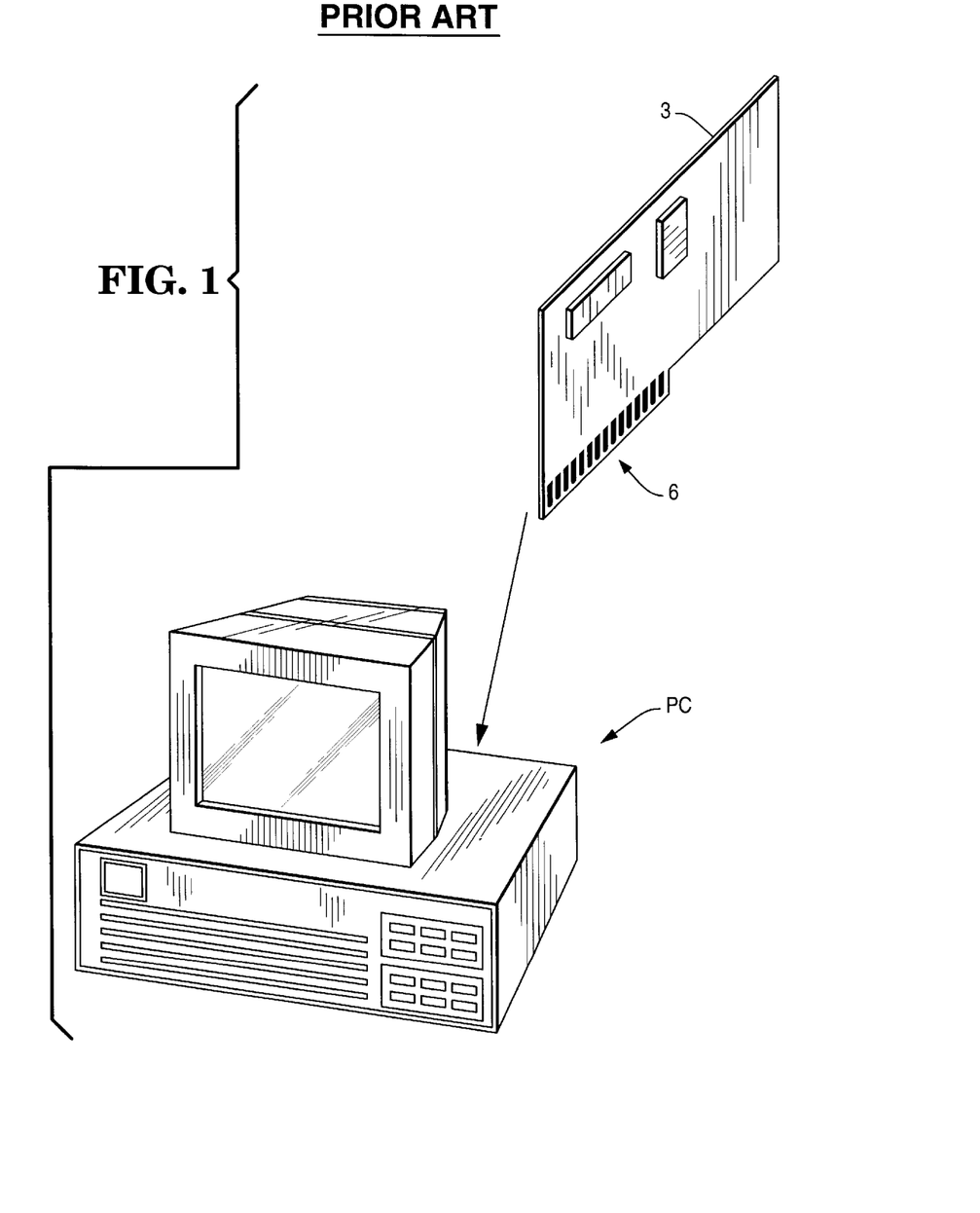
FIG. 1 illustrates an expansion card 3, for use with a computer PC.

Computers generally, and microcomputers specifically, such as the well known personal computer designed around the 8XX86 microprocessor developed by INTEL Corporation, Santa Clara, Calif., are designed to operate in conjunction with peripheral devices, such as tape drives and floppy diskettes, and with other accessories, such as "extension cards." FIG. 1 illustrates a generic extension card 3, for connection to a personal computer PC. Edge-card connectors 6 connect the extension card to the computer's system bus.

Many extension cards, and also some peripherals, require "configuration," meaning that the computer must be given information about the operating characteristics of the card, or peripheral. Commonly, the configuration is undertaken by a human user of the computer, by entering appropriate data into the computer. As a specific example, a configuration program can be supplied with the card, which is run by the user in connection with installation of the card. The user supplies information to the program, which the user obtains from an instruction manual supplied with the card, from an examination of the card itself, or from another source.

Involving the user in the configuration process is undesirable, because users can make mistakes in providing information to the configuration program. Further, the process of configuration is somewhat time-consuming to the user. Still further, as microcomputer systems become more powerful, and associated peripherals and accessories develop similarly high power, the configuration process can be expected to become more complex.

OBJECTS OF THE INVENTION

An object of the invention is to provide a system which simplifies the configuration process required when accessories and peripherals are added to computers.

SUMMARY OF THE INVENTION

In one form of the invention, equipment which is installed in a computer contains a code, which is readable by the computer. Software is supplied with the equipment, which contains a "look-up table" of configuration information. The computer obtains the code from the equipment, locates the equipment's configuration information in the table, using the code, and configures itself accordingly.

DETAILED DESCRIPTION OF THE INVENTION

One Form of Invention

Figure 2:
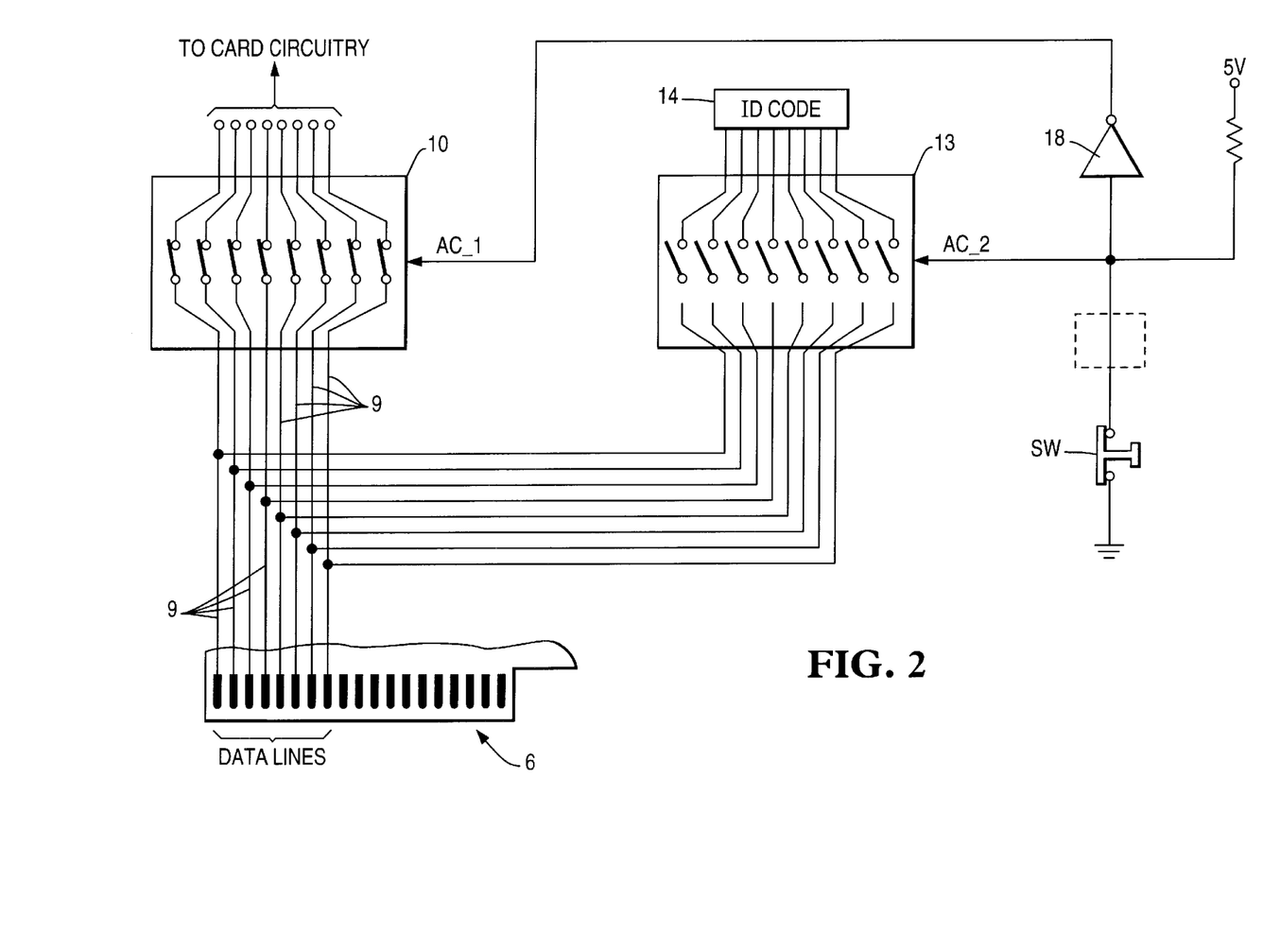
FIGS. 2 and 3 illustrate operation of one form of the invention.

FIG. 2 illustrates the edge-card connectors 6 shown in FIG. 1, and contained on the expansion card 3. The connectors 6 include data lines 9 which connect with the system bus (not shown) of the computer. These data lines 9 connect to bus 12, which leads to components (not shown) carried by the expansion card, and carries data for use by the components, in the usual manner.

The invention adds an identification code 14 to the card, which can take the form of a binary number, which is burned into Read Only Memory (ROM). This ID code 14 is connectable to the data lines, through switches 13, which can take the form of an array of Field Effect Transistors (FETs). A second set of switches 10 connects bus 12 with the data lines.

Switches 10 and 13 operate in the following manner: When a logic HIGH signal is applied to their actuation inputs, AC_1 or AC_2, the switches open. When a logic LOW signal is applied to their actuation inputs, AC_1 or AC_2, the switches close.

In FIG. 2, switch SW applies a LOW signal to AC_2, thereby causing switches 13 to remain open. This LOW signal is inverted by inverter 18, which applies a HIGH signal to switches 10, causing them to remain closed. These switch conditions allow normal operation: bus 12 is connected to the data lines 9 of the computer's system bus (not shown), but the ID code 14 is disconnected.

Figure 3:
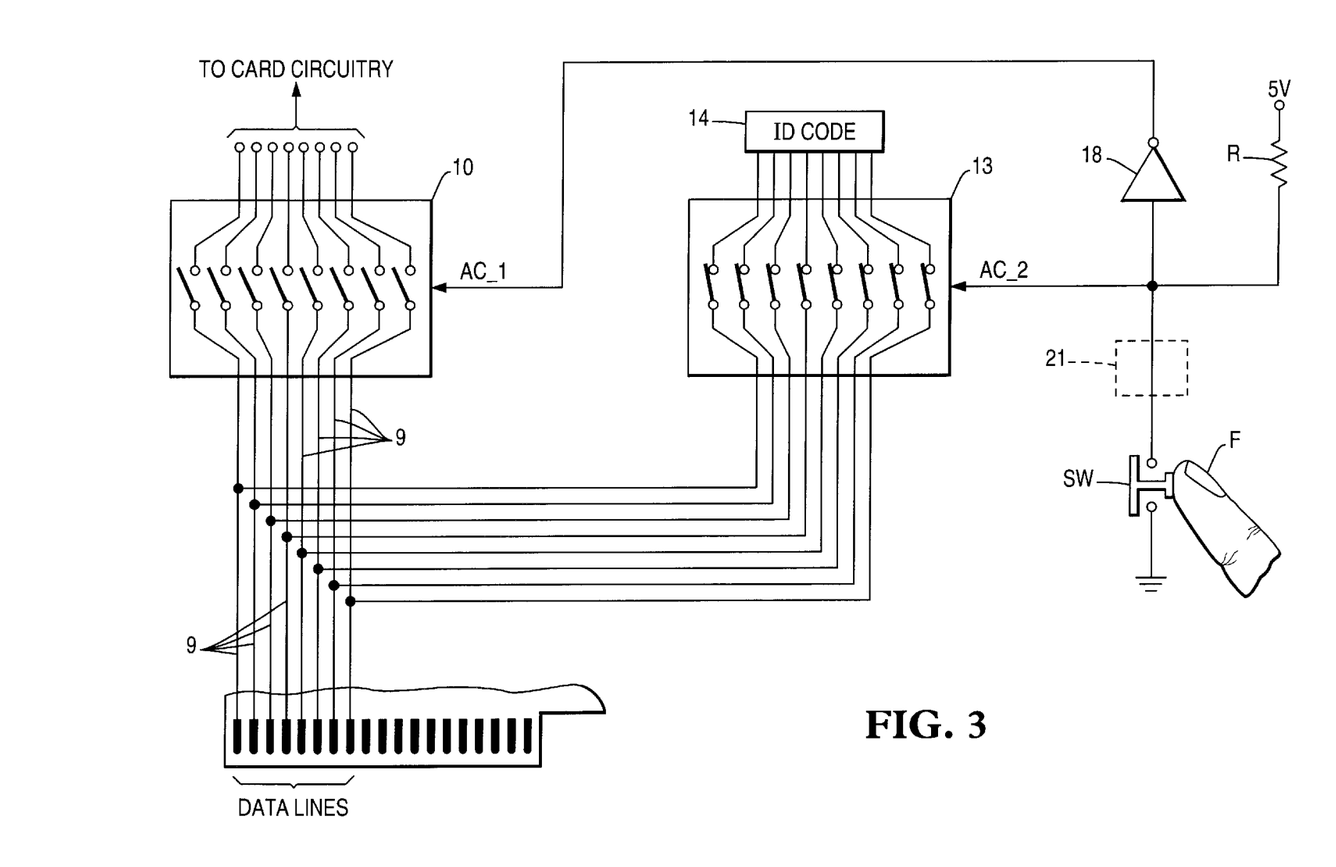

In order for the computer to read the ID code 14, a user opens switch SW, by finger F in FIG. 3, causing resistor R to apply a HIGH signal to AC_1, because resistor R is connected to a 5-volt supply, as indicated. This HIGH signal causes switches 13 to close. This HIGH signal is inverted by inverter 18, which applies a LOW signal to AC_1, causing switches 10 to open. These switch conditions apply the ID code 14 to the data lines 9, thereby allowing the computer to read the ID code 14.

It may be preferable to add some signal processing components, indicates by phantom block 21. These components can include de-bouncing circuitry. In addition, these components may include a one-shot, which detects opening of switch SW, and applies a HIGH signal to line AC_1 for a predetermined time, such as one minute. A primary purpose of the one-shot is to eliminate the possibility that the user accidentally leaves switch SW open, and thus accidentally leaves ID code 14 connected to the data lines 9. An alternate solution is to provide a switch SW which is spring-biased in a closed position, and which returns to the closed position when the user removes finger F.

Therefore, in FIGS. 2 and 3, an identification code 14 is contained on an expansion card. In normal operation, the identification code is not available to the computer, as in FIG. 2. When a user actuates a switch SW, the expansion card becomes disconnected from the computer's data lines 9, and the identification code becomes connected to the data lines.

Because of inverter 18, switches 10 and 13 are in opposite states: if switches 10 are open, then switches 13 are closed; if switches 10 are closed, then switches 13 are open.

The computer reads the ID code 14, and thereby learns the identity of the expansion card. Software running on the computer contains a listing of configuration requirements, grouped according to ID codes. The computer learns the configuration requirements of the expansion card, from the software, and takes the appropriate configuration measures.

Second Form of Invention

It may be desirable to eliminate the requirement that the user actuate switch SW in FIGS. 2 and 3. In such a case, the apparatus of FIG. 4 can be used. Line 25 is connected to one of the control lines contained in the computer's system bus, as indicated.

Figure 4:
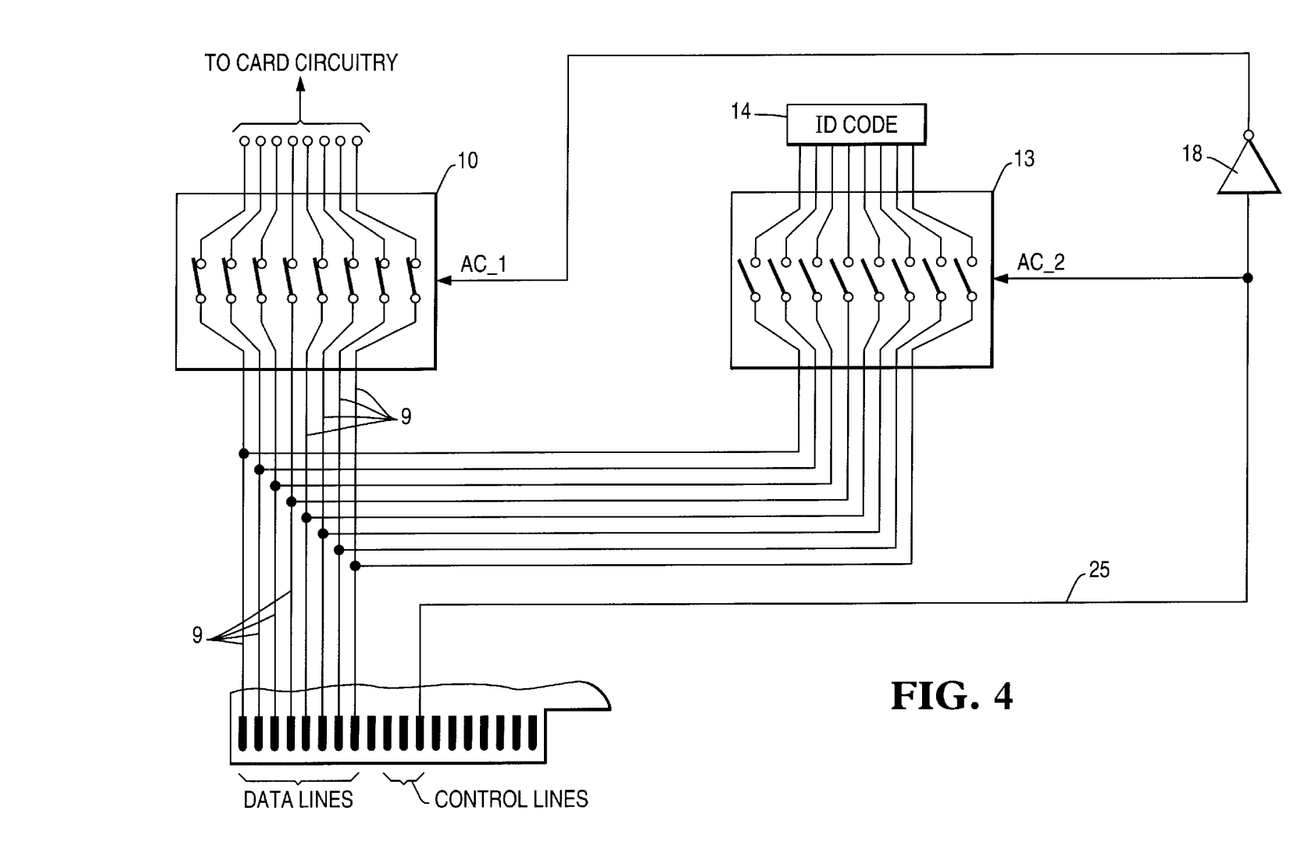
FIG. 4 illustrates another form of the invention.

If line 25 is pulled HIGH, by software control, then switches 13 close, and switches 10 open. ID code 14 becomes available to the data lines 9. If line 25 is pulled LOW, by software control, then switches 13 open, and switches 10 close. This condition represents normal operation. ID code 14 is isolated from the data lines 9.

Third Form of Invention

Situations may arise where a control line, such as line 25 in FIG. 4, is not available. The apparatus of FIG. 5 may then be used.

Figure 5:
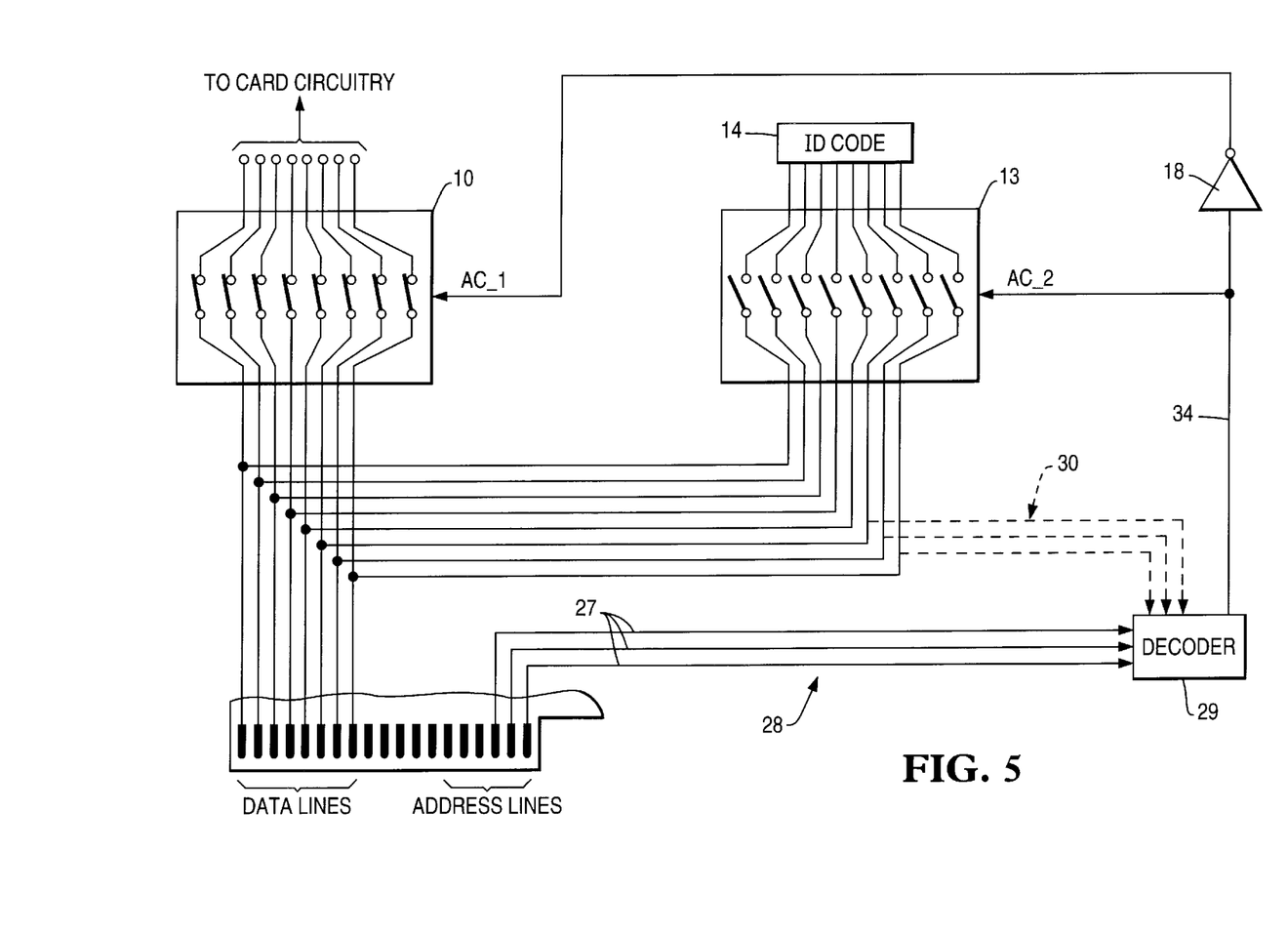
FIG. 5 illustrates another form of the invention.

Address lines 27 of the computer's system bus (not shown) are connected to a decoder 29. When a particular data word is applied to the lines 28, such as "111," then the decoder 29 produces a HIGH signal on its output 34. This HIGH signal closes switches 13, and opens switches 10.

When any other signal is applied to lines 28, decoder 29 produces a LOW signal on its output 34, thereby opening switches 13, and closing switches 10.

It may be desirable to use data lines 30, instead of address lines 28, as inputs of the decoder. Alternately, a combination of data lines 30 and address lines 28 may be used.

Fourth Form of Invention

It is possible that the approaches described in connection with FIGS. 4 and 5 may interfere with normal operation of the computer-expansion card system. As an alternate approach to controlling actuation lines AC_1 and AC_2, the invention may look for a predetermined sequence of data words on the data lines 9. When this sequence is detected, line AC_2 is pulled HIGH, connecting the ID code 14 to the data lines 9.

Simple State Machine

Figure 6:
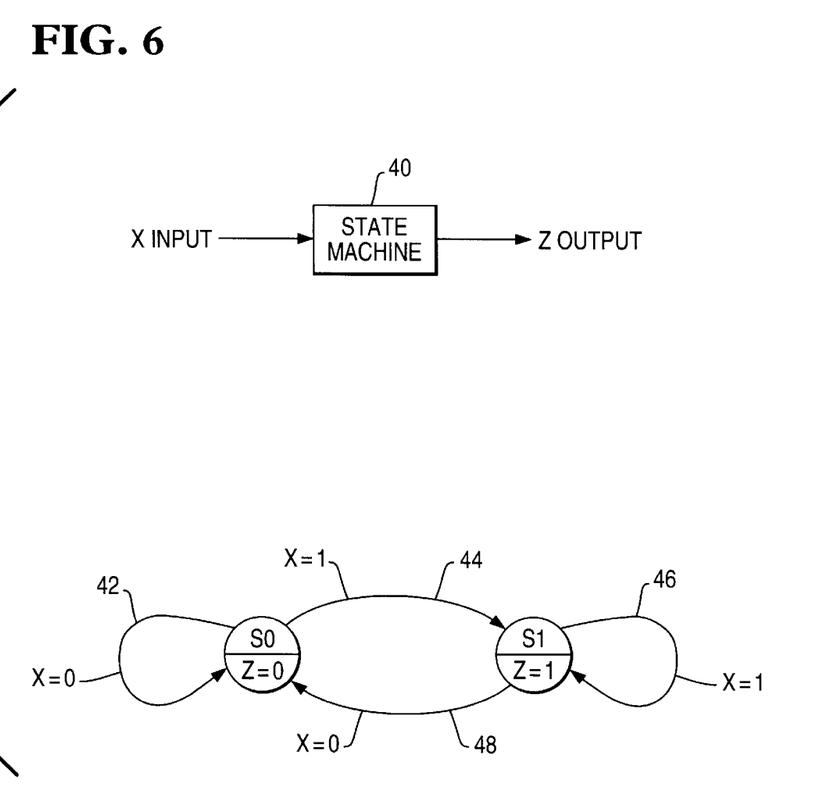
FIG. 6 illustrates a rudimentary state machine.

Detection of predetermined sequences is known in the art. One approach uses state machines. FIG. 6 illustrates an extremely simple state machine 40, to illustrate general principles. The state machine 40 contains a single-bit input X and a single-bit output Z.

The right side of the Figure illustrates a state diagram. When the machine resides in state 0, indicated by "S0" in the left-hand circle, the output, Z, is zero, as indicated by the phrase "Z=0."

When in this state, the input, X, can assume two values, ONE and ZERO. When X is ZERO, the machine remains in state 0, as indicated by arrow 42. When X is ONE, the machine moves to state 1, indicated by "S1." The movement is indicated by arrow 44. Now, the output, Z, changes to ONE, as indicated by the phrase "Z=1."

When in state S1, the input, X, can again assume two values, ONE and ZERO. When X is ONE, the machine remains in state 1, as indicated by arrow 46. When X is ZERO, the machine moves to state 0, as indicated by arrow 48. Now, after moving to state S0, the output Z returns to ZERO, as indicated.

More Complex State Machine

Figure 7:
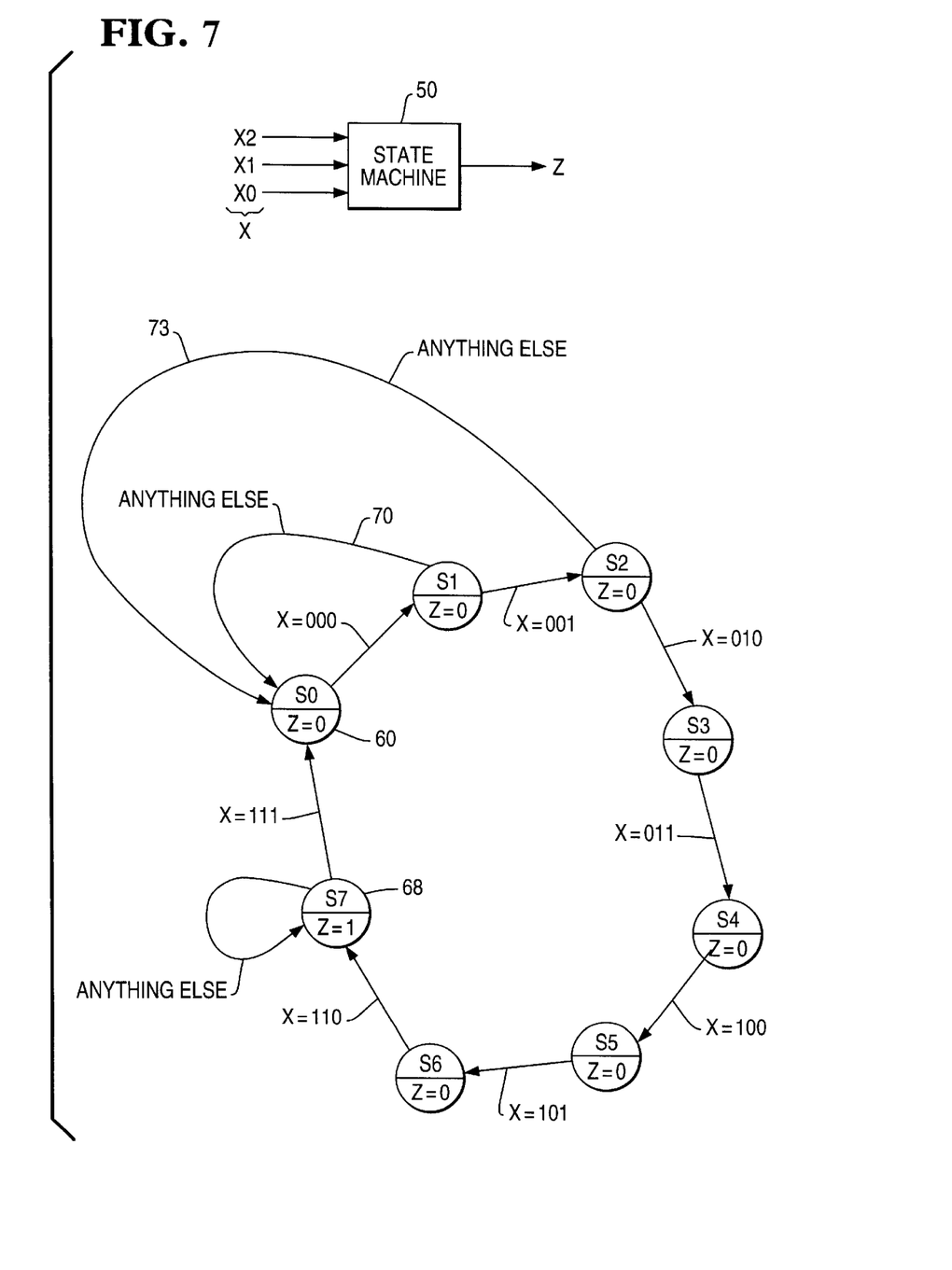
FIG. 7 illustrates a more complex state machine.

FIG. 7 illustrates a more complex state machine. FIG. 7 shows a three-bit input (X0, X1, and X2) for simplicity. These bits are taken from the data lines 9, shown in FIG. 5. However, in the general case, any number of bits of the data lines can be used, as well as combinations of data bits and other bits.

The right side of FIG. 7 shows one possible state diagram. The machine begins in state S0, wherein output Z is ZERO.

Figure 8:
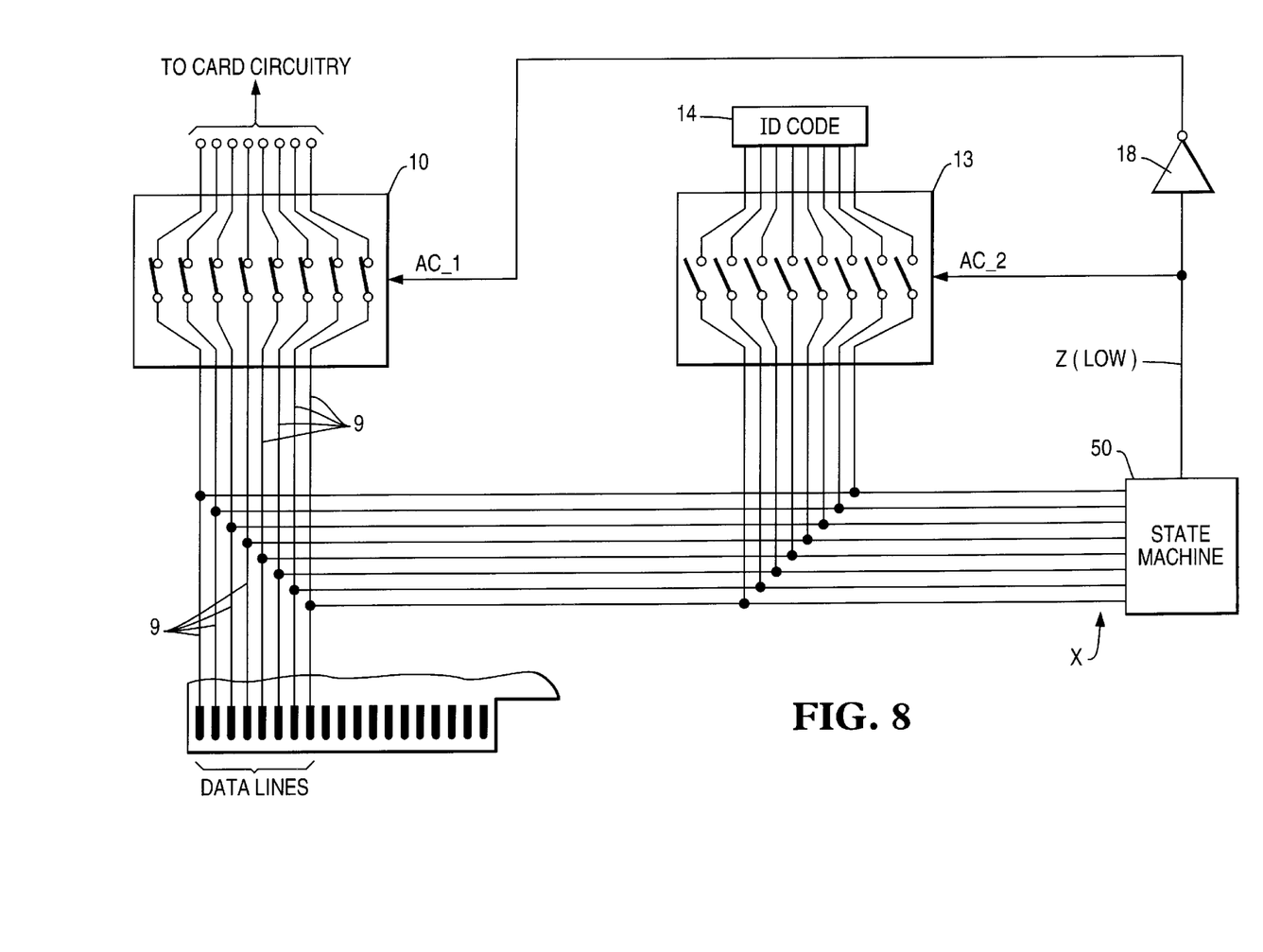
FIGS. 8 and 9 illustrate operation of another form of the invention.

Output Z is connected to actuation line AC_2, as indicated in FIG. 8. Since Z is ZERO at this time, because the machine 50 is in state S0, switches 13 are open and switches 10 are closed, as in normal operation.

To change Z from ZERO to ONE, the machine in FIG. 7 must move from state S0, through states S1 through S6, in sequence, and reach state S7, in circle 68. This is caused by applying the following sequence of numbers to input X of the state machine:

In state S0, apply X=000,
In state S1, apply X=001,
In state S2, apply X=010,
In state S3, apply X=011,
In state S4, apply X=100,
In state S5, apply X=101, and
In state S6, apply X=110.

If any other number, apart from those designated above, is applied, the machine returns to state S0, as indicated by arrows 70 and 73. (Arrows returning from states in addition to S1 and S2 are not shown, to avoid clutter.)

After the computer applies the number "110" while the machine is in state S6, the computer orders the data lines 9 in FIG. 2 to behave as input lines, so that the computer can read the ID code. Previously, the data lines 9 acted as output lines, so that the computer could apply the proper sequence of numbers to the state machine 50.

Figure 9:
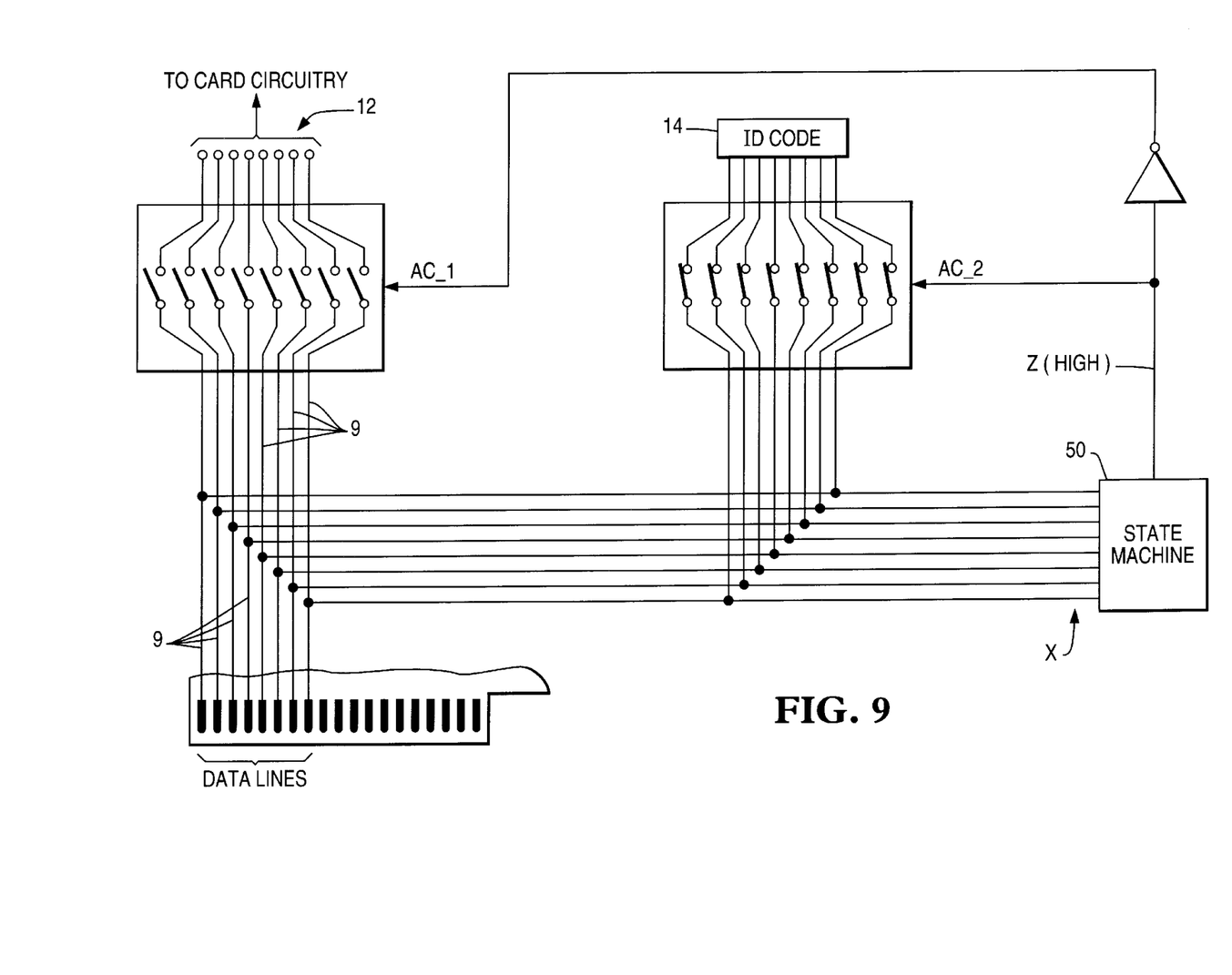

FIG. 8 shows the conditions when the machine 50 resides in any state other than S7: switches 13 are open, and switches 10 are closed, as in normal operation. FIG. 9 shows the conditions when the machine 50 resides in state S7: switches 13 are closed, and switches 10 are open. ID code 14 is available at the data lines 9, for the computer to read. Bus 12 is disconnected from the data lines 9.

The state machine is designed so that, once state S7 is reached, a specific number is required to return to state S0. The number "111" is indicated in FIG. 7. Any other number causes the machine 50 to idle in state S7, as indicated by the "ANYTHING ELSE" loop attached to state S7.

One reason for the "ANYTHING ELSE" loop is that, once output Z goes HIGH, the ID code 14 is applied, not only to the data lines 9, but also to the input X of the state machine. If the ID code is "ANYTHING ELSE" than "111," state S7 is maintained, and the ID code remains readable. If the ID code is "111," then the machine will exit state S7, and the ID code 14 will become disconnected from the data lines 9. Consequently, the ID code 14 cannot be allowed to assume the number "111."

With the apparatus shown in FIGS. 7, 8, and 9, a predetermined sequence of numbers is written to the data bus, in order to drive the state machine 50 into state S7. This sequence is designed as a sequence which will never be seen on the data lines 9, in normal operation. It may be thought that the data words appearing on the data lines 9 are random variables, and, because of that, they will, eventually, provide the proper sequence to reach state S7. However, accidentally reaching state S7 is extremely unlikely.

For example, if eight data lines 9 are present, they can carry 256 possible data words, at any one time. If the state machine requires a sequence of 7 specific words to reach the final state, such as S7 in FIG. 7, then the total number of possible sequences is $256^7$, or about $10^{24}$. If the computer applies one million words to the data lines every second, then about $10^{18}$ seconds will be required to exhaust all possibilities. $10^{18}$ seconds corresponds to about 31 billion years.

If 31 billion years are considered unacceptable, then longer data words, or a state machine having a larger number of states, or both, can be used.

This embodiment allows a computer to read the ID number of a peripheral, illustrated as an expansion card, by applying a specific sequence of data words to the data bus, control bus, or combination of the two. This embodiment eliminates the need for a dedicated line to actuate switches 10 and 13 in FIG. 2.

Additional Embodiment

In large computerized systems, multiple components are networked together, such as computers, printers, modems, mass storage devices such as disc- and tape drives, and so on. Under the invention, every device is equipped with a key code, indicated by the ID code 14 in FIG. 2. One computer is designated as a super administrator, whose function is to track installation and removal of components to and from the system.

For example, when a given printer is removed, and replaced by another printer, of a different type, the super administrator recognizes the replacement, and invokes any reconfiguration which is necessary, based on the ID code read from the printer.

As another example, the super administrator may detect other parameters beside addition and removal of components, as in a large merchandising establishment, wherein cash registers are equipped with bar-code readers which scan bar-codes affixed to items of merchandise which are sold. In some of these systems, the cash registers, in real time, communicate with a central computer, and update the inventory recorded in the central computer, based on the scanned items presently sold.

However, on days of heavy customer traffic, when all cash registers become very busy, the amount of inventory updating required can become so intense as to choke the central computer. The cash registers must be placed into a waiting queue, in order to deliver their updates.

The invention can recognize this change in operating status, and take appropriate action, such as bringing another computer on-line, to accept the inventory changes. Then, when the crush of sales has abated, the two computers communicate, and correctly update the inventory database, based on the respective inputs.

Characterization of Invention

Therefore, in one form of the invention, components are connected into a network, which may include one, or more, computers. The network can be widely distributed geographically, with different components located in different cities. The components include normal computer peripherals and accessories, as well as other equipment.

The components are equipped with ID codes, which are readable by a supervising computer. The Specification provides examples of apparatus to read the ID codes, without additional data lines or busses for this purpose. One apparatus applies an unusual sequence of data words to a data bus, which is read by a state machine, which responds only to that unusual sequence. When the state machine detects the unusual sequence, it connects an ID code to the data bus, allowing the ID code to be read by any agent listening to the bus, such as the supervising computer.

When the supervising computer reads the ID code, it consults a look-up table, and takes specific action, based on content of the table. One specific action may be to configure hardware to accommodate the equipment identified by the ID code. Another specific action may be to call for the ID code in response to detection of removal, and subsequent reconnection, of a component from the system, such as a printer. The call for the ID code ascertains whether the identity of the component has changed, and indicates whether a re-configuration is required. (Detection of removal of many types of components is known in the art. For example, it is quite common for computers to detect that a printer is not responding, because disconnected, by virtue of the absence of responses to handshake signals.)

In one embodiment, the supervising computer maintains a list of the identities of all components within its network, and periodically polls all these components, asking for their ID codes. If the ID codes received indicate that each type of peripheral is the same as listed, and that no change in configuration is required, no change is undertaken. This kind of operation can occur when a peripheral has not changed, or has changed, but to a peripheral of the same type.

If an ID code received indicates that a peripheral has, in fact, changed, the supervising computer identifies the new peripheral, determines the configuration required, and takes appropriate action.

During polling, some peripherals may not respond by transmitting their ID codes. The lack of response can be caused by (i) disconnection of the peripheral from the network or (ii) remaining connected, but residing in an unpowered state. However, the lack of response is not necessarily considered significant. More significant is whether the ID code received from the peripheral has changed at two different time intervals.

Numerous substitutions and modifications can be undertaken without departing from the true spirit and scope of the invention. What is desired to be secured by Letters Patent is the invention as defined in the following claims.

I claim:

1. In a computer system, the improvement comprising:
   a) a first peripheral, connected to a data bus, comprising
      i) an identification code; and
      ii) means for allowing the computer to periodically read said identification code when the computer transmits a predetermined sequence of one or more data words onto the data bus; and
   b) a plurality of other peripherals, connected to said data bus, which do not respond to said sequence of data words.

2. System according to claim 1, wherein the means of paragraph (a)(ii) responds to the predetermined sequence by placing the identification code onto the data bus.

3. System according to claim 1, wherein a single peripheral, and no others, responds to the predetermined sequence by placing the identification code onto the data bus.

4. In a system which includes at least one computer and several cash registers which communicates with said computer, the improvement comprising the following steps, undertaken without human intervention:
   a) at intervals, causing each cash register to transmit an ID code to the computer;
   b) determining whether the ID code has changed between intervals and, if so,
      i) ascertaining configuration parameters, based on the ID code, and
      ii) implementing said configuration parameters
   and, if not, making no change in existing configuration parameters.

5. In the operation of a computer network, the improvement comprising the following steps, undertaken without human intervention:

a) at intervals, searching for new components connected to the network;
b) when new components are detected,
   i) reading identity codes from the new components;
   ii) ascertaining configuration parameters required to accommodate the new components by a process which includes the step of using the identity codes to find said configuration parameters in a table of such parameters; and
   iii) implementing said configuration parameters.

6. A method of configuring devices which are connected to a network, comprising the following steps:

a) periodically reading a code from each device;
b) after reading a code from a device, ascertaining whether that device has been newly connected to the network and,
   i) if so, deriving configuration parameters for that device, based on the code read from the device, and running a process which establishes said configuration parameters for the newly connected device; and
   ii) if not, deriving no parameters for the device.

* * * * *